United States Patent [19]

Siewert

[11] 4,306,975
[45] Dec. 22, 1981

[54] SIEVE APPARATUS CONTAINING A ROTATABLE CIRCULAR SIEVE

[75] Inventor: Wolfgang Siewert, Ravensburg-Weingartshof, Fed. Rep. of Germany

[73] Assignee: Escher Wyss GmbH, Ravensburg, Fed. Rep. of Germany

[21] Appl. No.: 148,752

[22] Filed: May 12, 1980

[30] Foreign Application Priority Data

May 21, 1979 [CH] Switzerland .................. 4740/79

[51] Int. Cl.³ .................................. B01D 33/10
[52] U.S. Cl. .......................... 210/394; 210/403; 210/404; 210/408
[58] Field of Search ........... 210/402, 403, 784, 374, 210/412, 415, 404, 408, 394, 409, 411, 414

[56] References Cited

U.S. PATENT DOCUMENTS

| | | |
|---|---|---|
| 2,750,855 | 6/1956 | Lathrop .......................... 210/403 |
| 3,150,082 | 9/1964 | Rich .............................. 210/404 |
| 3,193,927 | 7/1965 | Libbels et al. ................ 210/403 |
| 3,401,801 | 9/1968 | Wedemeyer et al. ......... 210/394 |
| 4,038,187 | 7/1977 | Saffran ......................... 210/403 |
| 4,062,776 | 12/1977 | Blok ............................ 210/403 |

*Primary Examiner*—Benoit Castel
*Attorney, Agent, or Firm*—Werner W. Kleeman

[57] ABSTRACT

A sieve apparatus containing a circular sieve or screen, possessing at a portion of its circumference an impervious region. The impervious region of the circular screen forms a trough in which there can be formed a liquid sump for washing the material which is to be treated. In the case of a circular sieve or screen, formed of perforated sheet metal, the impervious region can be free of holes or openings. If the circular sieve or screen is formed of a sieve or filter material, then the circular sieve is covered at the impervious region. Spray tubes or the like serve for spraying the circular sieve, the material which is to be treated and for forming the liquid sump.

11 Claims, 6 Drawing Figures

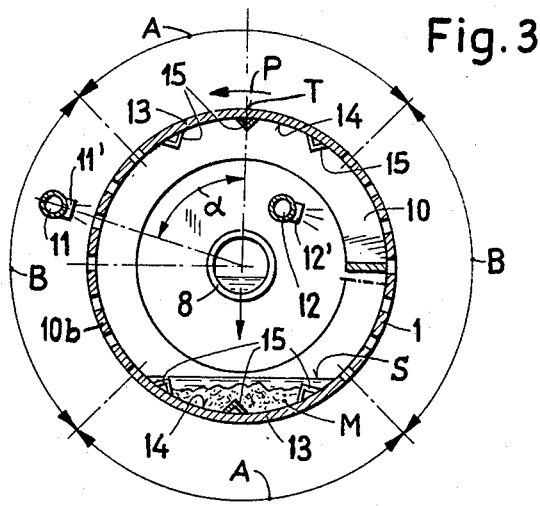
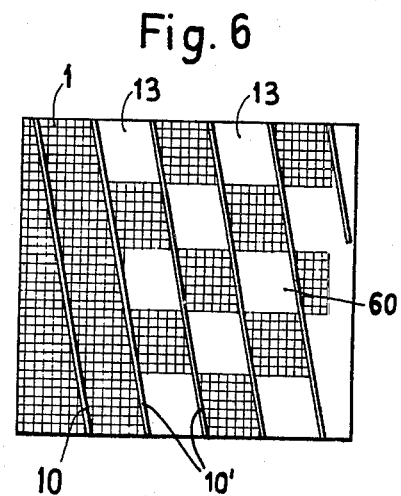
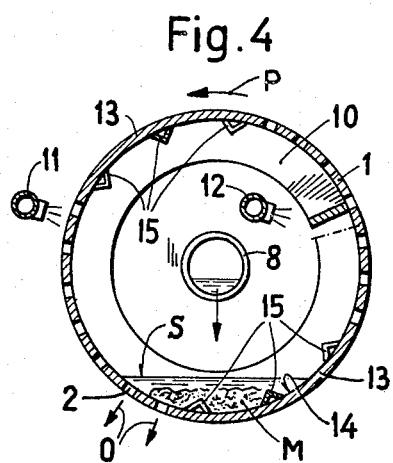
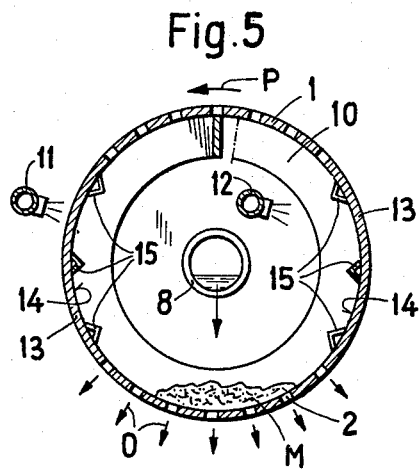

SIEVE APPARATUS CONTAINING A ROTATABLE CIRCULAR SIEVE

BACKGROUND OF THE INVENTION

The present invention relates to a new and improved construction of a sieve or screening apparatus comprising a rotatable circular sieve or screen, equipped with a feed or conveyor worm, the helical surface of which bears against the inner wall of the circular sieve or screen.

Heretofore known sieve or screening equipment of this type possess a substantially cylindrical circular sieve, which has sieve openings or holes distributed over its entire circumferential surface. Circular sieves or screens of this type are used for concentrating suspensions of solid substances in liquids, as a rule water, but also for separating coarser substances. Thus, for instance, in the papermaking industry there are already known sieve or screening equipment of this type, which during the processing of wastepaper, serves to wash-out useful paper fibers from separated-out contaminants or rejects. The paper fibers pass through the sieve or wire which is provided with suitable openings, whereas the larger size contaminants or rejects which are to be separated, such as, for instance, foil pieces, wires, textile pieces and so forth, remain at the sieve and thereafter are eliminated. However, it is also possible, when working with correspondingly finer sieves or screens to remove through the sieve materials such as fillers, fine substances and fine contaminants or rejects, whereas the cleaned fiber substances remain at the sieve.

The efficiency of the washing operation, with the heretofore known circular or cylinder sieves is however inadequate, so that in many instances it is necessary to use dynamic jarrers or vibrators. But this type of equipment is noisy, prone to malfunction and has a poor sorting capability.

SUMMARY OF THE INVENTION

Therefore, with the foregoing in mind it is a primary object of the present invention to provide a new and improved construction of sieve apparatus containing a rotatable circular sieve or screen, which is not afflicted with the aforementioned drawbacks and limitations of the prior art proposals.

Another and more specific object of the present invention aims at the provision of a new and improved construction of sieve apparatus of the aforementioned type, wherein the separation and elimination operations can be accomplished with appreciably greater efficiency than was heretofore possible through the use of simply a prior art circular sieve or screen.

Yet a further significant object of the present invention aims at providing a new and improved construction of sieve apparatus containing a rotatable sieve cylinder or roll, which is relatively simple in construction and design, economical to manufacture, extremely reliable in operation, not readily subject to breakdown or malfunction, requires a minimum of maintenance and servicing, and affords a highly effective separation and elimination operation with respect to the processed materials.

Now in order to implement these and still further objects of the invention, which will become more readily apparent as the description proceeds, the sieve apparatus of the present development is manifested by the features that the circular sieve or screen is provided with at least one region which is impervious to the liquid. This impervious region extends along part of the circumference of the circular sieve or screen and, together with neighboring portions of the feed or conveyor worm, forms a trough or vat serving to entrap the liquid and for forming a liquid sump. A liquid infeed line is provided for the infeed of a flushing or washing liquid.

With such type constructed sieve apparatus the separation operation is improved in that, the material or substance which is to be processed is not only sprayed, rather it is additionally washed within the liquid sump or pool. This liquid sump is formed whenever the impervious region, during each revolution of the circular sieve or screen, appears at the lower region thereof, so that the flushing or washing liquid can collect in such liquid sump. As a general rule, there can be used for the flushing or washing liquid water. In principle, the sieve apparatus therefore is converted, in the explained manner, into a sieve and washing apparatus.

The effectiveness of the liquid sump can be additionally increased in that, according to a further aspect of the invention, cam or dog-like protruding parts or elements are provided at the impervious region of the circular sieve. These dog-like protruding parts or protuberances effectuate a tearing-up and turbulence of the material mass, located at the lower region of the feed worm and conveyed by the feed worm, so that this material mass is better accessible to the action of the flushing or washing water or the like.

When the sieve apparatus is formed of a perforated sheet metal or other suitable material provided with perforations, then the impervious region can be free of holes or openings. Through the saving in the formation of the holes or openings the inventive sieve or screen apparatus is less expensive to fabricate, notwithstanding its improved efficiency, in relation to equipment having a completely perforated circular sieve or screen.

If, on the other hand, the circular sieve or screen of the sieve apparatus is composed of a suitable sieve or filter material, for instance a sieve or screen mesh or wire gauze, then it can be covered at the location of the impervious region.

As a rule, it is possible to provide a number of impervious regions, which are uniformly distributed about the circumference of the circular sieve or screen.

When working with a number of impervious regions, it is then possible to arrange in a checkerboard-like offset manner the regions between the individual coils of the feed or conveyor worm. Consequently, there is obtained a more uniform flow of the water through the circular sieve or screen, something which is particularly favorable for subsequently connected pumps which feed the flushing or washing liquid.

However, it is also possible, when working with a number of impervious regions to arrange the latter such that they form strips extending in the axial direction of the circular sieve and in each case extending over a number of the coils or helixes of the conveyor or feed worm. This design is particularly then advantageously employed whenever the impervious region is obtained by covering the sieve openings.

Preferably, there can be arranged externally of the sieve or screen a liquid line or conduit having nozzles or equivalent structure directed towards the sieve. Such type liquid line or conduit arrangement, not only enables spraying of the material or mass which is to be treated and the formation of a liquid sump or pool, but at the same time also permits cleaning of the sieve or screen, since particles adhering to the sieve are sprayed back into the internal space of the circular sieve or screen. For this purpose, the spray nozzles can be directed essentially perpendicularly towards the circular sieve or screen and can be located at a position at the circumference of the sieve or screen, which, viewed in the direction of rotation of such sieve, is located 60° to 80° following the uppermost location of the circular sieve.

However, it is also possible to arrange, internally of the circular sieve or screen, a liquid line or conduit equipped with spray nozzles. Such type line or conduit arrangement either can be used to advantage alone or in conjunction with a line or conduit located externally of the sieve at the location where the holes of the sieve do not afford an adequate through-passage of the water from the outside towards the inside.

BRIEF DESCRIPTION OF THE DRAWINGS

The invention will be better understood and objects other than those set forth above, will become apparent when consideration is given to the following detailed description thereof. Such description makes reference to the annexed drawings wherein:

FIG. 3 is a cross-sectional view of the arrangement of FIG. 1, shown on an enlarged scale, and taken substantially along the line III—III thereof;

FIGS. 4 and 5 are sectional views of the apparatus, corresponding to the showing of FIG. 3, however, portraying different positions of the circular sieve or screen; and FIG. 6 is a development view, corresponding to the showing of FIG. 2, of a different embodiment of sieve apparatus and shown on a reduced scale.

DETAILED DESCRIPTION OF THE PREFERRED EMBODIMENTS

Figure 1:
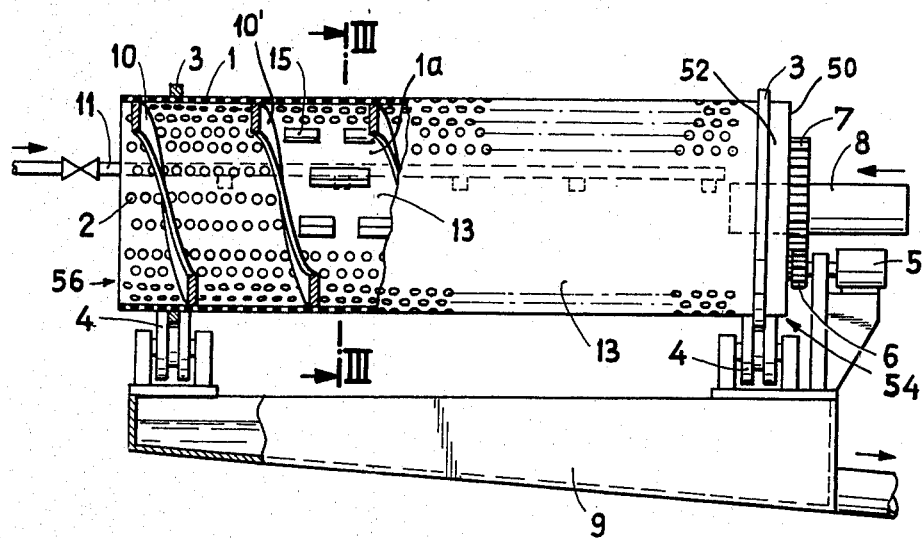
FIG. 1 is a front view, partially in section, of a sieve or screening apparatus according to the invention.

Describing now the drawings, in FIG. 1 there is illustrated a first exemplary embodiment of inventive sieve or screen apparatus, comprising a circular sieve or screen 1—also referred to in the art as a sieve cylinder or roll—containing punched holes or openings 2. The circular sieve or screen 1 is provided with guide rings 3 or equivalent structure which are supported upon rolls 4 and enable rotation of the circular sieve or screen 1. Rotation of the circular sieve 1 is accomplished by a suitable drive, here shown as comprising an electric drive motor 5, through the intermediary of a pinion 6 and a toothed rim or gear 7 or equivalent structure which is secured at an end wall, generally indicated by reference character 50 of the circular sieve 1. Piercingly extending through the schematically represented opening 52 of the end wall 50 is an infeed conduit or line 8 serving for the infeed of the material mass or product M which is to be treated, into the internal compartment 1a of the circular sieve 1. Within the circular sieve or screen 1 there is located a suitable feed or conveying device, here shown as a feed or conveyor worm 10 or equivalent structure, which with appropriate direction of rotation of the circular sieve or screen 1, renders possible a transport of the material mass remaining at the circular sieve 1 from the inlet end region 54 of the equipment, which is provided with the infeed conduit or line 8 to the opposite outlet end region 56, as best seen by referring to FIG. 1. Below the circular sieve 1 there is located a receiving or catch container 9 for the liquid or suspension of solids in the liquid, which has passed through the circular sieve or screen 1.

As best seen by referring to FIGS. 1 and 3, the sieve apparatus is provided with liquid lines or conduits 11 and 12, which as a general rule, constitute water lines for the infeed of flushing and washing water. The lines or conduits 11 and 12 are provided with spray nozzles 11' and 12' respectively, serving to direct the spray water against the wall 1b of the circular sieve 1 both from the outside and from the inside as best seen by referring to FIG. 3. The spray jets of the spray nozzles 11' are directed essentially perpendicular to the surface of the circular sieve or screen 1, and they are dispositioned at a location of the circumference of the circular sieve 1 which, viewed in the direction of rotation of such circular sieve, is disposed at an angle $\alpha$ (FIG. 3) of about 60° to 80° with respect to the topmost location or crown T of the circular sieve 1. As also will be recognized by reverting to FIGS. 1 to 3, the circular sieve or screen 1 is provided with impervious regions 13, which in each instance form troughs or vats 14 owing to the domed or curved configuration of such regions 13. The troughs or vats 14 are suitable for the formation of a liquid sump or pool S. The related base or floor of the troughs or vats 14 are formed, in each instance, by the impervious regions 13 of the circular sieve or screen 1. Viewed in the axial direction of the circular sieve 1, the troughs or vats 14 are bounded by neighboring portions or regions of the feed or conveyor worm 10.

Figure 2:
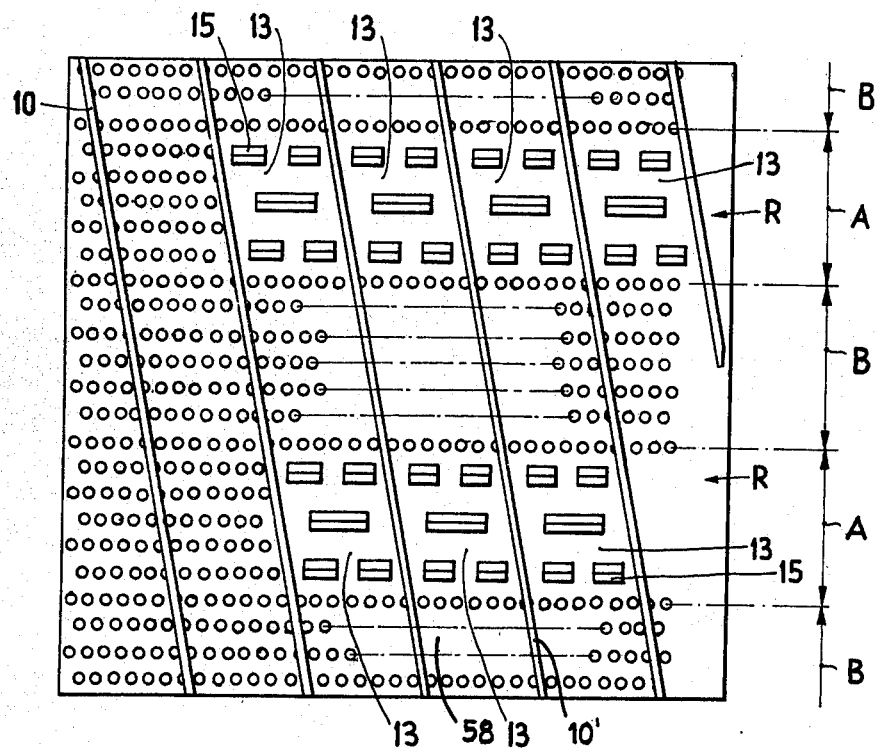
FIG. 2 is a development of the circular sieve or screen of the apparatus of FIG. 1.

As will also be recognized by referring to FIGS. 1 to 3, the impervious regions 13 are provided with protruding dog-like elements or portions 15, which, in accordance with the illustration, are arranged laterally offset in the channels 58 formed by the coils or windings 10' of the feed or conveyor worm 10. The protuberances or dog-like projecting elements 15, as illustrated, can be secured to the circular sieve 1 or also can be formed thereat, for instance by embossing or other suitable metal-working techniques or otherwise.

In accordance with the illustration of FIGS. 2 and 3 the impervious regions 13 are arranged in two rows R, which extend in each case over a number of the coils or windings 10' of the conveyor worm or worm means 10. These rows R are offset through about 180° at the circumference of the circular sieve or screen 1, and the impervious regions 13 correspond to two quadrants A and the sieve regions to two quadrants B at the circumference of the circular sieve or screen 1, as best seen by referring to the development view of FIG. 2. FIGS. 4 and 5, viewed in conjunction with FIG. 3, serve to explain the mode of operation of the sieve apparatus of the invention.

Now in the position of the equipment as shown in FIG. 3, a liquid sump or pool S has formed in the trough or vat 14, within which there has immersed the material mass M which is to be treated. This liquid sump S is formed under the action of the liquid jets emanating from the nozzles 11' and/or 12', and the liquid which is located at the liquid sump S is tossed about or circulated and the circular sieve or screen 1 is sprayed by the liquid jets. Due to the action of the liquid jets emanating from the spray nozzles 11' located externally of the circular sieve or screen 1, there is additionally attained the beneficial effect that the holes or openings 2 of the circular sieve or screen 1 are sprayed from the outside, and thus, cleaned of any possibly clogging parts.

FIG. 4 illustrates a position which the circular sieve or screen 1 has reached following one revolution thereof in the direction of the arrow P. In this position there is initiated an outflow from the trough or vat 14 through the openings or holes 2 of the neighboring sieve region as has been indicated by the arrows O. The material mass M has thus moved in the direction of the lowest location of the circular sieve or screen 1, due to the continuous turbulence of the material mass by the action of the spray jets emanating from the spray nozzles 11' and 12' and also due to the action of the protuberances or dog-like projection elements 15.

In the position shown in FIG. 5 the circular sieve 1 has performed a rotation through 90° in relation to the position depicted in FIG. 3, so that the impervious region 13 together with the trough or vat 14, in which previously there was located the material mass M, is dispositioned at the right-hand side of such FIG. 5. The water forming the sump S, in the showing of FIG. 3, now can freely flow-off through the openings or holes 2, thereby dewatering the material mass M, and specifically, for such length of time until it slides at the following impervious region 13 in whose trough or vat 14 there is formed a new liquid sump or pool S.

Hence, there is realized a beneficial operational mode, wherein ultimately the material mass M is thinned in a liquid sump S and washed and then in the subsequent sieve section or portion is dewatered and sprayed. In this way it is possible to wash contaminates or rejects of wastepaper which are separated out during the production of new stock suspension, and there are obtained still usable paper fibers which can pass through the circular sieve or screen 1, whereas the contaminants or rejects remain at the circular sieve 1. On the other hand, it is also possible to clean stock fibers, already obtained from wastepaper, from finer mixtures, such as for instance fillers, short fiber pieces and so forth. In this case the good stock fiber remains adhering to the circular sieve or screen 1.

Finally, in FIG. 6 there is shown a different possible arrangement of the impervious regions 13 upon the circular sieve 1. While with the embodiment of FIG. 2 the impervious regions 13 were arranged in rows R, here with the arrangement of FIG. 5 the impervious regions 13 are arranged in a checkerboard-like offset fashion between the individual coils or windings 10', defining as in FIGS. 1 to 5 the helixes or helical surface means, of the conveyor or feed worm 10. Hence there is obtained a more uniform outflow of the liquid from the circular sieve or screen 1. Although with the embodiment of FIG. 2 the liquid sumps or pools S of a row R are simultaneously filled and thereafter emptied, this filling and emptying operation, with the modified construction of circular sieve 1 shown in FIG. 6, occurs in each instance at the same time. One half of the liquid pools or sumps are filled whereas the other half are emptied.

Finally, instead of forming the impervious regions 13 in the manner previously explained, i.e. by failing to form the holes or openings 2 at predetermined discrete portions of the circular sieve 1, it would be possible, for instance, to form the circular sieve or screen 1 of a suitable sieve or filter material as previously explained, and then to cover, by the schematically represented cover members 60 of FIG. 6, portions of the sieve to form the impervious regions 13.

While there are shown and described present preferred embodiments of the invention, it is to be distinctly understood that the invention is not limited thereto, but may be otherwise variously embodied and practiced within the scope of the following claims. Accordingly,

What I claim is:

1. A sieve apparatus comprising: a rotatable circular sieve having an inner wall structured such that at least one portion thereof is pervious over part of the circumference of the rotatable circular sieve;
   a feed worm provided with helical surface means coacting with said inner wall of said circular sieve;
   said circular sieve being provided with at least one region which is impervious to liquid;
   said impervious region extending along a portion of the circumference of the circular sieve, being located adjacent said at least one pervious portion in the circumferential direction of said rotatable circular sieve, and forming in conjunction with neighboring portions of the feed worm a trough serving to catch liquid and for forming a liquid sump; and
   liquid infeed means for the infeed of a flushing liquid.

2. The sieve apparatus as defined in claim 1, further including:
   protuberance means arranged at the impervious region of the circular sieve.

3. The sieve apparatus as defined in claim 2, wherein:
   said protuberance means comprise projecting dog-like elements.

4. The sieve apparatus as defined in claim 1, wherein:
   said circular sieve is formed of perforated sheet metal; and
   said impervious region is free of holes defined by the perforations of said perforated sheet metal.

5. The sieve apparatus as defined in claim 1, wherein:
   said circular sieve is essentially completely formed of a sieve material; and
   cover means for covering each location, constituting the impervious region.

6. The sieve apparatus as defined in claim 1, further including:
   a plurality of said impervious regions which are essentially uniformly distributed about the circumference of the circular sieve.

7. The sieve apparatus as defined in claim 1, wherein:
   said circular sieve contains a plurality of said impervious regions; and
   said impervious regions being arranged in a mutually offset substantially checkerboard-like fashion between individual helix coils of said feed worm.

8. The sieve apparatus as defined in claim 1, wherein:
   said circular sieve contains a plurality of said impervious regions; and
   said plurality of impervious regions extending in the axial direction of the circular sieve and forming rows which extend over a number of helix coils of the feed worm.

9. The sieve apparatus as defined in claim 1, wherein:
   said liquid infeed means comprise a liquid line arranged externally of the circular sieve and equipped with spray nozzle means directed towards said circular sieve.

10. The sieve apparatus as defined in claim 9, wherein:
    said spray nozzle means are directed essentially perpendicularly in the direction of said circular sieve and are dispositioned at a location of the circumference of the circular sieve, which, viewed in the direction of rotation of said circular sieve, is situated at an angle in the order of about 60° to 80° following the topmost location of the circular sieve.

11. The sieve apparatus as defined in claim 1, wherein:
said liquid infeed means comprises a liquid line equipped with spray nozzle means and arranged internally of said circular sieve.

* * * * *